United States Patent
Nuri

(10) Patent No.: US 8,347,782 B2
(45) Date of Patent: Jan. 8, 2013

(54) FRUIT AND VEGETABLE SLICER

(76) Inventor: Itai Ezra Nuri, Netanya (IL)

(*) Notice: Subject to any disclaimer, the term of this patent is extended or adjusted under 35 U.S.C. 154(b) by 422 days.

(21) Appl. No.: 12/712,382

(22) Filed: Feb. 25, 2010

(65) Prior Publication Data

US 2010/0212517 A1 Aug. 26, 2010

(30) Foreign Application Priority Data

Feb. 26, 2009 (IL) .......................................... 197288

(51) Int. Cl.
*A23N 7/08* (2006.01)
*B26B 3/00* (2006.01)

(52) U.S. Cl. ................ 99/540; 99/541; 99/542; 99/564; 30/300; 30/310; 30/123.7

(58) Field of Classification Search .................... 99/540, 99/541, 542, 564, 552, 553; 30/310, 300, 30/123.5, 123.6, 123.7; 83/878, 875
See application file for complete search history.

(56) References Cited

U.S. PATENT DOCUMENTS

| 1,042,823 | A |   | 10/1912 | Richard |   |
|---|---|---|---|---|---|
| 1,182,629 | A |   | 5/1916 | Birnbaum |   |
| 2,121,097 | A | * | 6/1938 | Polk et al. | 426/482 |
| 2,468,282 | A | * | 4/1949 | Wood | 30/113.3 |
| 2,503,097 | A | * | 4/1950 | Chavez | 30/113.2 |
| 2,505,917 | A | * | 5/1950 | Schumacher | 30/113.3 |
| 4,246,700 | A | * | 1/1981 | Coulon et al. | 30/300 |
| 5,930,901 | A | * | 8/1999 | Gerhardt | 30/310 |
| 5,937,524 | A |   | 8/1999 | Hornsby |   |
| 6,382,089 | B1 | * | 5/2002 | Thiffault | 99/506 |

FOREIGN PATENT DOCUMENTS

GB 756361 9/1954

* cited by examiner

*Primary Examiner* — Benjamin Layno

(57) ABSTRACT

A fruit or vegetable slicer, particularly suitable for slicing between the edible portion of a watermelon and its rind. The slicer comprises a cutting blade made a thin flexible or bendable food compatible material and having at least one cutting edge; a positioning strip; and a connector mechanism for operably connecting distal ends of the cutting blade and positioning strip to each other and adapted to allow the positioning strip and cutting blade to swivel relative to the connector mechanism.

17 Claims, 6 Drawing Sheets

US 8,347,782 B2

FRUIT AND VEGETABLE SLICER

RELATED APPLICATIONS

The present invention claims priority from Israel patent application IL 197288, filed on Feb. 26, 2009 and entitled "Fruit and Vegetable Slicer", which is incorporated herein by reference in its entirety.

FIELD OF THE INVENTION

The present invention relates to instruments for cutting or slicing fruit or vegetables, in particular for cutting a watermelon.

BACKGROUND OF THE INVENTION

It is believed that the prior art consists of the following publications: U.S. Pat. No. 1,042,823 (Richard, Oct. 29, 1912); U.S. Pat. No. 1,182,629 (Birnbaum, May 9, 1916); U.S. Pat. No. 5,937,524 (Hornsby, Aug. 17, 1999); and GB 756,361 (Salaman, Sep. 4, 1954).

SUMMARY OF THE INVENTION

The present invention relates to a device and method for cutting (slicing) an inner portion (i.e. edible) of a fruit or vegetable from its rind or peel. As the device is particularly well suited for slicing the edible portion of a watermelon from its rind, the device may be, with intention of limitation, hereinafter referred to as a "slicer" or "watermelon slicer", although it should be understood that the slicer may be suitable for implementation with other fruits and vegetables.

According to certain embodiments of an aspect of the invention there is provided a fruit and vegetable slicer for removing the edible portion of a fruit or vegetable from its rind or peel, the slicer comprising: a cutting blade made a thin flexible or bendable food compatible material and having at least one cutting edge; a positioning strip; and a connector mechanism for operably connecting distal ends of the cutting blade and positioning strip to each other and adapted to allow the positioning strip and cutting blade to swivel relative to the connector mechanism.

According to certain embodiments of another aspect of the invention there is provided a method of slicing an inner portion of a fruit or vegetable from its rind or peel comprising: cutting the fruit or vegetable substantially into halves; providing a fruit or vegetable slicer comprising a cutting blade having at least one cutting edge; a positioning strip; and a connector mechanism operably connecting between the cutting blade and positioning strip at their distal ends; inserting said distal ends of the slicer at the interface of the rind or peel and the inner portion until the distal ends are approximately at the center of the rind/peel of the fruit or vegetable; positioning the positioning strip away from the rind (e.g. in a generally upright position); and moving cutting blade about the rind/inner portion interface until a full rotation has been completed.

BRIEF DESCRIPTION OF THE DRAWINGS

The invention may be understood upon reading of the following detailed description of non-limiting exemplary embodiments thereof, with reference to the following drawings, in which.

DESCRIPTION OF EMBODIMENTS OF THE INVENTION

Figure 1:
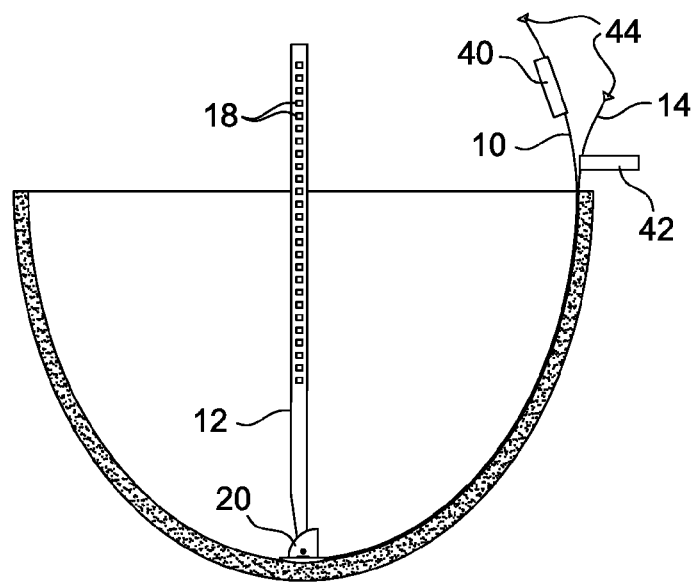
FIG. 1 is a side view of an embodiment of a fruit and vegetable slicer of the present invention used in slicing the edible portion of a watermelon from its rind.
Figure 2:
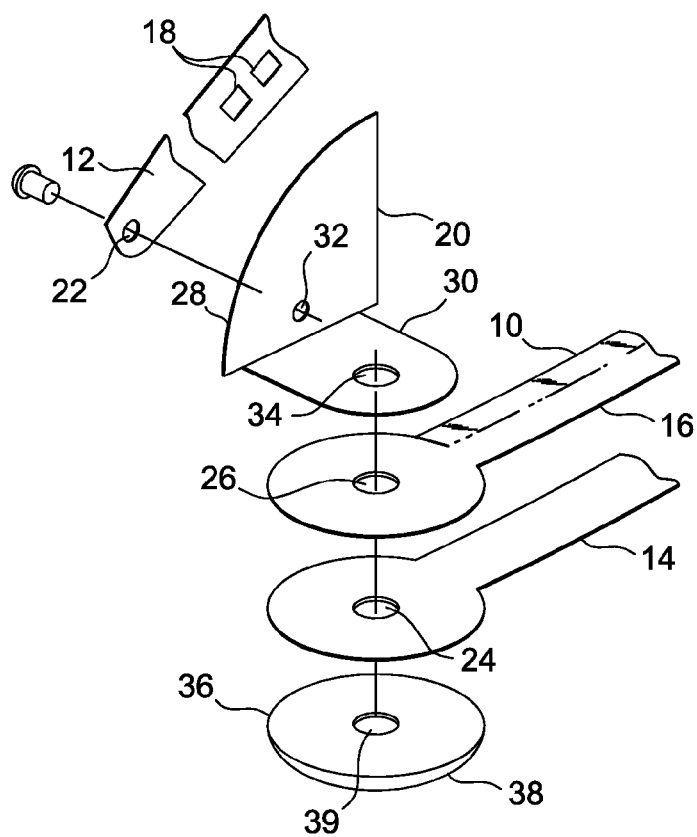
FIG. 2 is an exploded perspective view of portions of certain components of the present slicer.

With reference to the FIGS. 1 and 2 there are shown certain embodiments of a watermelon slicer of the present invention. The watermelon slicer comprises a cutting blade 10; a positioning strip 12, typically a thin elongated substantially rigid strip; and a stabilizing strip 14, typically a thin elongated flexible or bendable strip. Regardless, according to some embodiments, the watermelon slicer does not include the stabilizing strip 14 (or the stabilizing strip is of a length wherein it does not typically extend out of the watermelon).

Cutting blade 10 is typically a thin flexible or bendable strip made of a food compatible material such as stainless steel and has a cutting edge 16; in some embodiments a pair of such cutting edges.

In some embodiments, cutting blade 10 has a curved side (not shown) intended to approximately match the curvature of typical sized watermelons; and to ease cutting. In some embodiments, stabilizing strip 14 also has a curved side (not shown) intended to approximately match the curvature of typical sized watermelons.

Positioning strip 12 is typically a substantially rigid strip made of a food compatible material such as stainless steel and according to some embodiments has a series of spaced apart holes 18 arranged along the length of the strip whose purpose will become apparent.

Cutting blade 10, a positioning strip 12 and stabilizing strip 14 are operably connected to each other at their distal ends (the ends inserted into the watermelon) at a connection head 20. For such purpose those distal ends respectively comprise holes 26, 22 and 24. Connector head 20 comprises a shark-fin shaped fin portion 28 and a projecting member 30 which are typically essentially perpendicular to each other. Fin portion 28 is useful for helping guide the watermelon slicer into the watermelon, furthermore, it prevents connector head 20 from shimmying sideways. For connecting the aforementioned distal ends, fin portion 28 and projecting member 30 have holes 32 and 34, respectively. The components can be connected by any appropriate fastener (not shown), for example, a rivet or the like that allows spinning or swiveling of the blade 10 and strips 12 and 14 relative to the connector head 20. As will be understood, positioning strip 12 need not be swivelable. The connector head 20 preferably further comprises a fastener end cap 36 having a curved outer surface 38 being the surface that interfaces with the rind of the watermelon and prevents the connector head 20 from penetrating into the rind. In some embodiments, fastener end cap 36 is integral with blade 10 or stabilizing strip 14. In some embodiments, fastener end cap 36 also has a hole 39 for facilitating connection.

According to some embodiments, cutting blade 10 and stabilizing strip 14 include handles 40 and 42, respectively, designed so that they do not interfere, or have limited interference, with each other during slicing of the watermelon, described below. Therefore, for example, handle 42 is shown as perpendicular to stabilizing strip 14 and extending outwardly; and handle 40 is substantially oriented along cutting blade 10.

Positioning strip 12 may also have a handle (not shown). Handles 40 and 42 are preferably positionable at different heights along their respective blade/strip to ease cutting, for example, designed to be slidable. For comfort, cutting blade 10 and stabilizing strip 14 typically include caps or tops 44 for comfortable interface with a user's thumb or finger.

Operation

Figure 3:
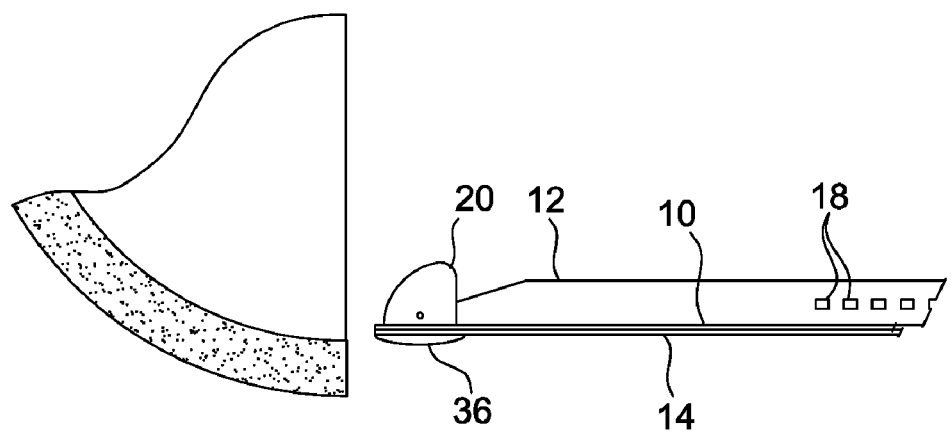
FIGS. 3-5 are side views of the present slicer at various stages of entry into a watermelon.
Figure 4:
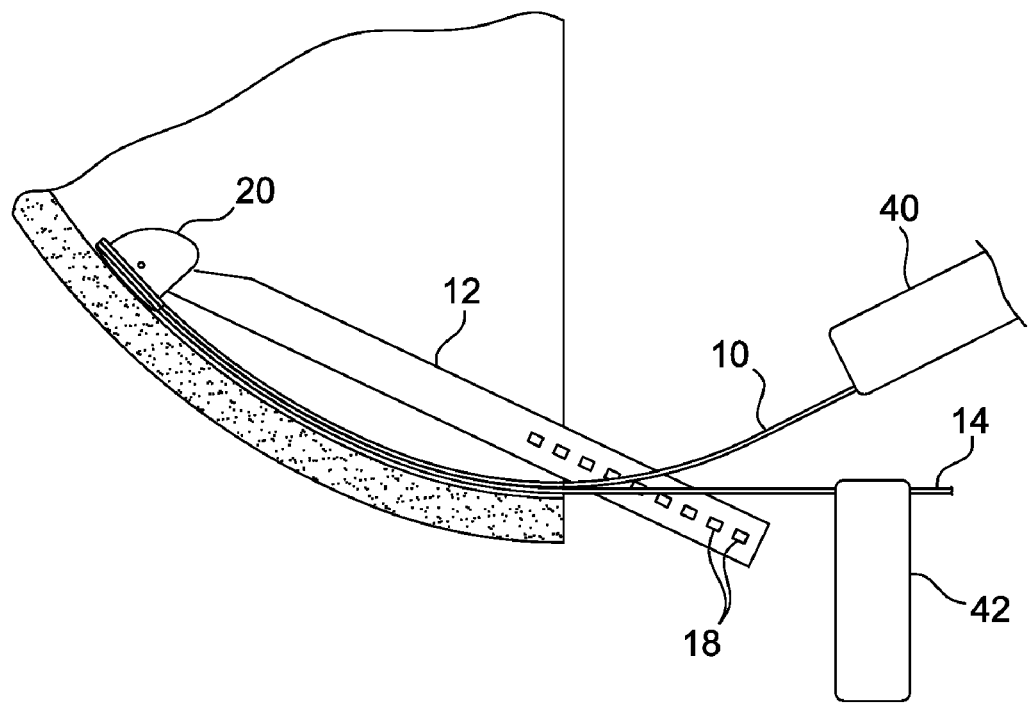
Figure 5:
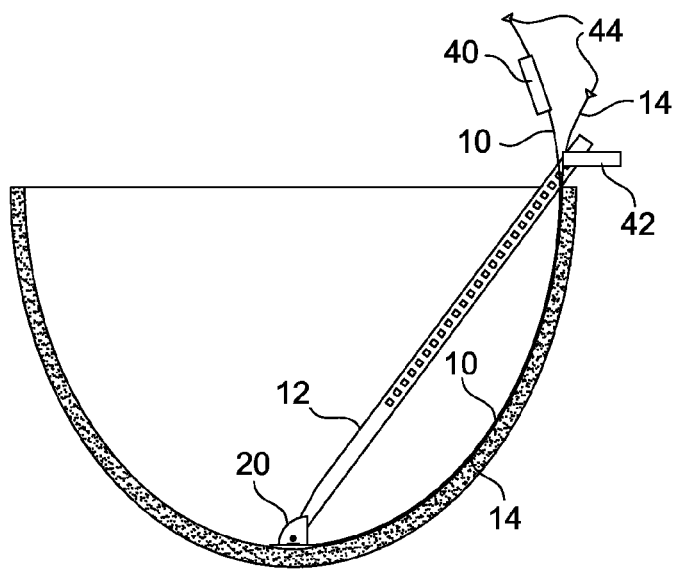

To slice the edible portion of the watermelon from its rind using the watermelon slicer with respect to the above-described embodiments of the present invention, the watermelon is first cut into halves, or the operable equivalent. Then the watermelon slicer is inserted between the rind and its inner edible portion (see FIGS. 3-5) with the connector head 20 first entering the watermelon with the stabilizing strip 14 abutting the inner portion of the rind and the cutting blade 10 adjacent thereto (or vice versa). Positioning strip 12 will at first also be relatively close to the rind/edible portion interface. Next, the slicer is pushed into the watermelon until the user believes the connector head 20 is approximately in the middle of the watermelon, i.e. the "center" of the rind (FIG. 5), at which time positioning strip 12 is put in a generally vertical (upright) position to help verify the center position of the positioning strip and connector head 20 (FIG. 1). However, the watermelon can be cut easily as long as the positioning strip 12 is away from the rind.

Due to the flexibility of the cutting blade 10 (and stabilizing strip 14, if any), positioning strip 12 and connector head 20 need not be exactly in the so-called center position, however, it is typically preferable. To improve on the positioning, blade 10 (and strip 14) can be further inserted or partially pulled back to achieve proper center positioning.

At this point, slicing commences. Cutting blade 10 is moved about the rind/edible portion interface until a full rotation has been completed. The user may find it convenient to grasp stabilizing strip 14 while the watermelon is being cut.

Figure 6:
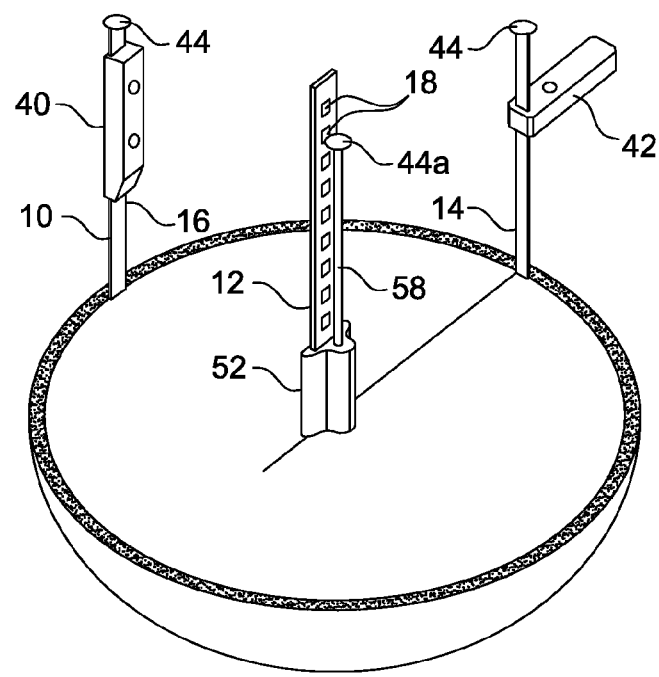
FIG. 6 is a perspective view of another embodiment of the present slicer during slicing of the watermelon.
Figure 7:
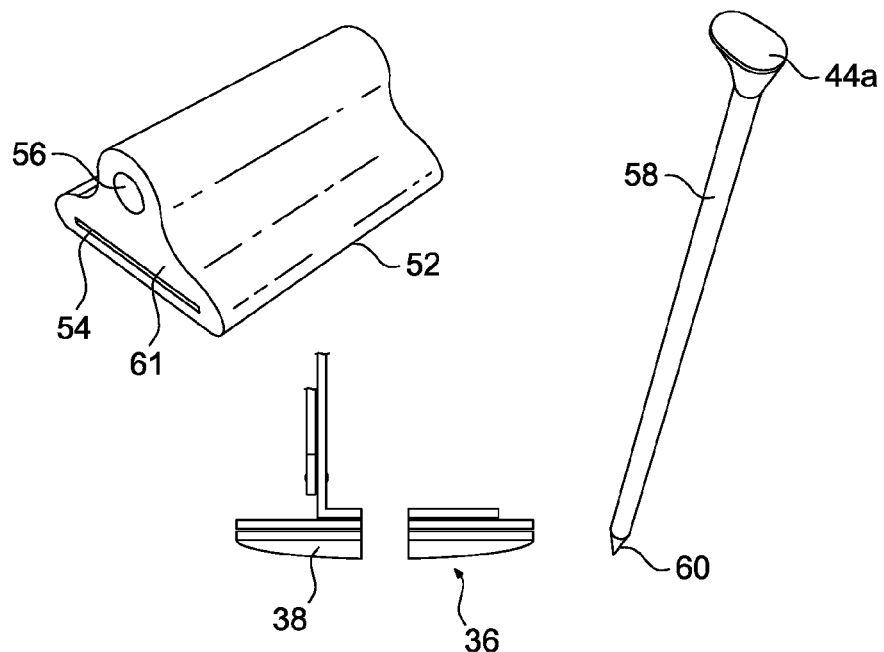
FIG. 7 is an exploded view of portions of certain components of the slicer of FIG. 6.
Figure 8:
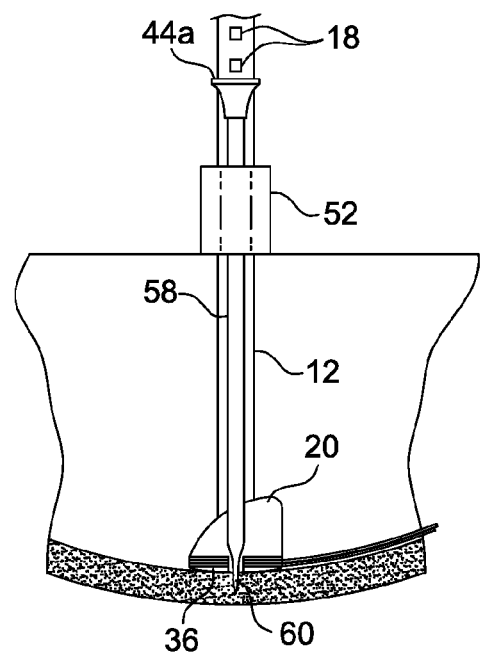
FIG. 8 is a side view of the portions of FIG. 7 arranged in the watermelon.

According to particular embodiments, positioning strip 12 has associated therewith a slicer fixing mechanism for fixing the positioning strip and connector head 20 to the rind. FIGS. 7 and 8 (and partially seen in FIG. 6) show an exemplary slicer fixing mechanism comprising: a positioning strip fixing member 52 having a through slit 54 parallel to positioning strip 12, whereby the fixing member is snugly slidable along positioning strip 12; a through hole 56 parallel to through slit 54 and positioning strip 12; and a skewer 58 dimensioned to be slidable in hole 56. Skewer 58 has a relatively sharp tip 60 at one end and typically a cap 44a, analogous to caps 44. Prior to penetrating into the rind, skewer 58 passes through hole 56 or another appropriate hole or passageway (not shown).

After positioning strip 12 is located in the center of the watermelon (FIG. 6) positioning strip fixing member 52 is slid onto the positioning strip. It may be useful to slide positioning strip fixing member 52 downward until it interfaces with the watermelon, thereby adding stability to the positioning strip's position. In this regard, the bottom surface of fixing member 52 may have a relatively broad surface 61 to stably interface with the top of the watermelon; and alternatively or optionally may, instead or in combination with the aforementioned relatively broad surface, have a projecting portion (not shown) to penetrate the watermelon. Then skewer 58 is pushed through hole 56 of fixing member 52 downward through connector head 20 until its tip 60 penetrates into the rind, thereby fixing the position of the slicer fixing mechanism and connector head 20, preferably in or near the center of the watermelon.

Figure 9:
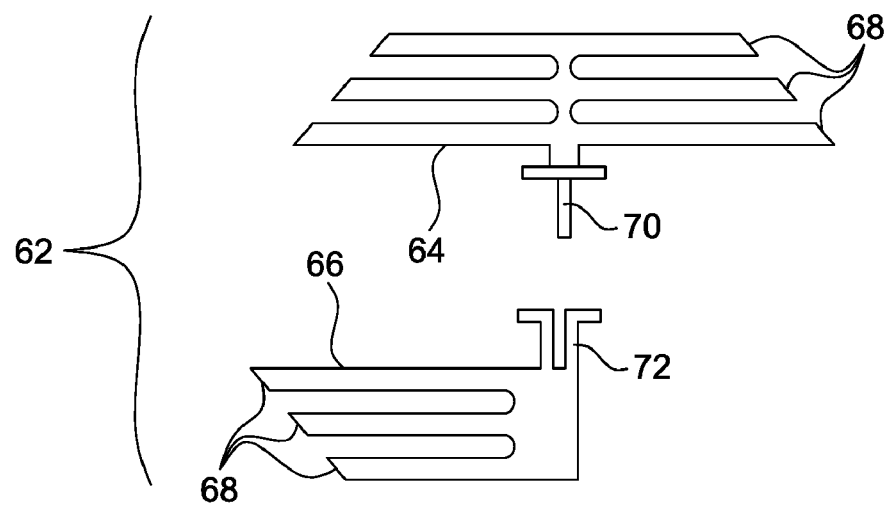
FIGS. 9-11 illustrate a modification of the above embodiments of the present slicer.
Figure 10:
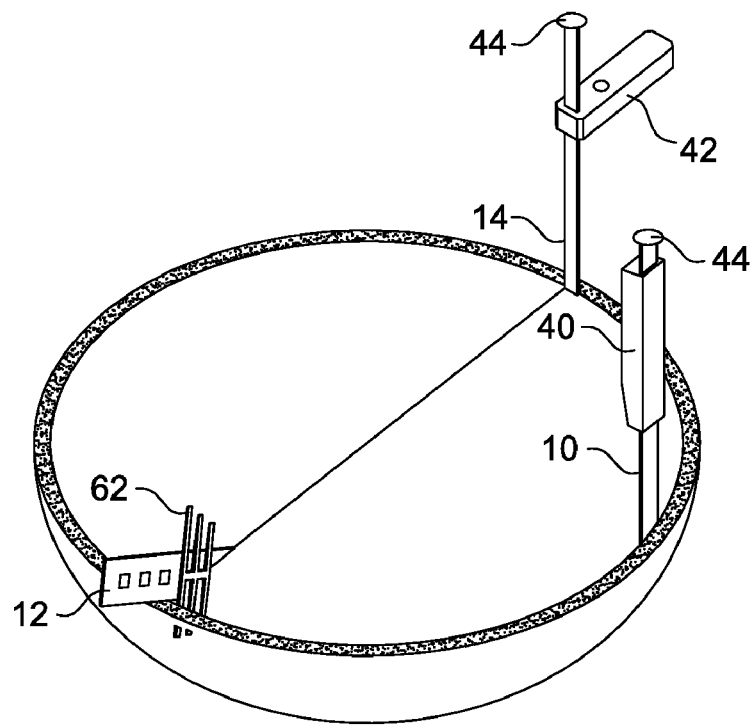
Figure 11:
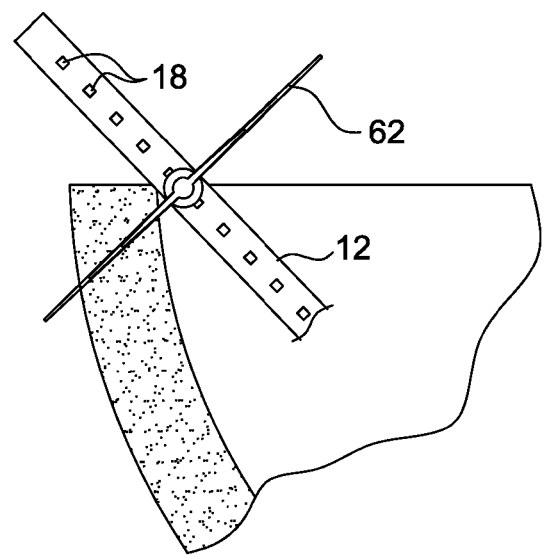

FIGS. 9-11 illustrate another exemplary slicer fixing mechanism wherein it includes a rind penetrating fork 62. Fork 62 is formed by a male fork portion 64 and a female fork portion 66 each having a series of teeth 68 arranged in sequentially greater lengths. According to some embodiments, teeth 68 are arranged in more than one row (not shown). Male fork portion 64 has a male connector 70 dimensioned to pass through any one of holes 18 and to be releasably received within a corresponding female connector 72 of female fork portion 66. According to some embodiments, fork 62 can be designed to statically attach to positioning strip 12; whereas in other embodiments, the fork can swivel on the positioning strip to facilitate a potentially easier or stronger penetration into the rind.

After positioning strip 12 is located in the center of the watermelon, such as illustrated in FIG. 1, rind penetrating fork 62 is connected to the positioning strip a bit above the watermelon. To accomplish this, male connector 70 of fork portion 64 is passed through an appropriate hole 18 of positioning strip 12 and into female connector 72 of female fork portion 66. Then positioning strip 12 is moved adjacent to the rind, either next to stabilizing strip 14 or opposite thereto (as shown in FIG. 10). Alternatively, rind penetrating fork 62 is connected to the positioning strip 12 at this time. Then fork 62 is inserted into the rind and cutting blade 10 is used to cut the watermelon by moving it clockwise or counter clock wise. Regardless of the initial location of positioning strip 12 and penetrating fork 62, when cutting blade 10 approaches positioning strip 12, the positioning strip's fork 62 is removed from the rind, the positioning strip is moved 180 degrees across the watermelon to the other side, and the fork is again inserted into the rind. At this point, cutting is resumed until the watermelon has been fully cut.

Figure 12:
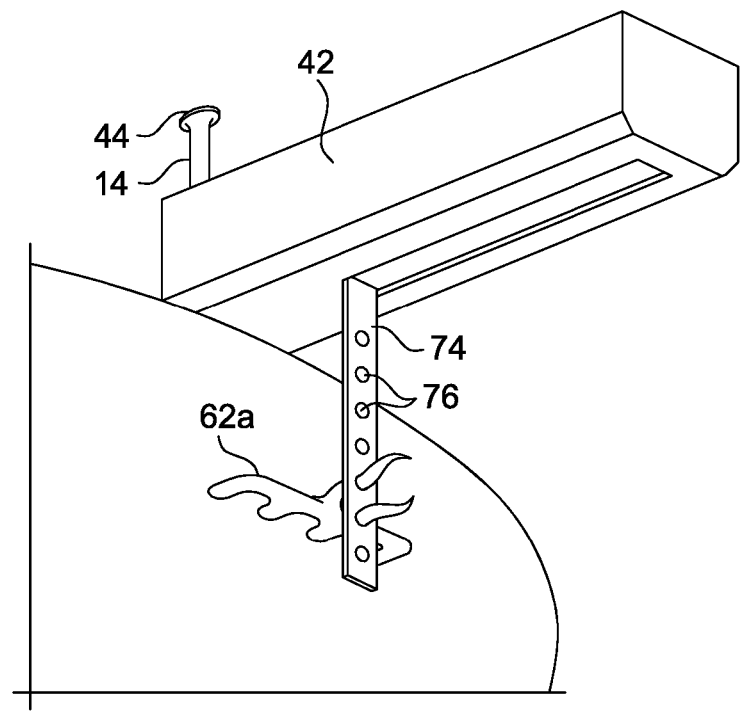
FIG. 12 illustrates another modification of the above embodiments of the present slicer.

According to yet another embodiment (depicted in FIG. 12), a rind attaching mechanism, for example, comprising a fork 62a is attached to handle 42 of stabilizing strip 14 to fix the distance that the stabilizing strip and cutting blade 10 penetrate into the watermelon, whereby the position of connector head 20 is then static. Fork 62a can be attached, for example, to handle 42 by a connector 74, which may have a mechanism to allow adjustable connection with fork 62a, for example, including holes 76.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

The invention claimed is:

1. A fruit and vegetable slicer for removing the edible portion of a fruit or vegetable from its rind or peel, the slicer comprising:
   a cutting blade made a thin flexible or bendable food compatible material and having at least one cutting edge;
   a positioning strip; and
   a connector mechanism for operably connecting distal ends of the cutting blade and positioning strip to each other and adapted to allow the positioning strip and cutting blade to swivel relative to the connector mechanism, wherein the positioning strip has associated therewith a slicer fixing mechanism for fixing the positioning strip and connector mechanism to the rind or peel of the fruit or vegetable.

2. The slicer according to claim 1, further comprising a stabilizing strip having a distal end operably connected to the distal ends of the cutting blade and the positioning strip.

3. The slicer according to claim 2, wherein the stabilizing strip has a handle adjacent a proximal end thereof.

4. The slicer according to claim 2, wherein the stabilizing strip has a curved side.

5. The slicer according to claim 2, further comprising a rind attaching mechanism including a fork to fix the distance that the stabilizing strip and cutting blade penetrate into the fruit or vegetable.

6. The slicer according to claim 1, wherein the cutting blade has a handle adjacent a proximal end thereof.

7. The slicer according to claim 1, wherein the food compatible material is a stainless steel.

8. The slicer according to claim 1, wherein the cutting blade has a curved side.

9. The slicer according to claim 1, wherein the connector mechanism comprises a fin-shaped portion for helping guide the slicer.

10. The slicer according to claim 1, wherein the connector head comprises a fastener end cap having a curved outer surface.

11. The slicer according to claim 1, wherein the slicer fixing mechanism comprises a positioning strip fixing member having a through slit parallel to the positioning strip whereby the positioning strip fixing member is snugly slidable along the positioning strip; a through hole parallel to through slit and positioning strip; and a skewer dimensioned to be slidable in said through hole.

12. The slicer according to claim 1, wherein the positioning strip fixing member comprises a bottom surface adapted to interface with the top of the fruit or vegetable.

13. The slicer according to claim 1, wherein the slicer fixing mechanism comprises a rind or skin penetrating fork.

14. The slicer according to claim 13, wherein the penetrating fork is formed by a male fork portion and a female fork portion each having a series of teeth arranged in sequentially greater lengths.

15. The slicer according to claim 14, wherein the teeth are arranged in more than one row.

16. The slicer according to claim 13, wherein the penetrating fork is designed to statically attach to positioning strip.

17. The slicer according to claim 13, wherein the penetrating fork is designed to swivel on the positioning strip.

* * * * *